April 5, 1960 C. H. BROWN 2,931,108
EDUCATIONAL TYPEWRITER SIMULATING TOY
Filed Sept. 12, 1958 2 Sheets-Sheet 1

INVENTOR.
CLAYTON H. BROWN,
BY
McMorrow, Berman + Davidson
ATTORNEYS.

April 5, 1960
C. H. BROWN
2,931,108
EDUCATIONAL TYPEWRITER SIMULATING TOY
Filed Sept. 12, 1958
2 Sheets-Sheet 2
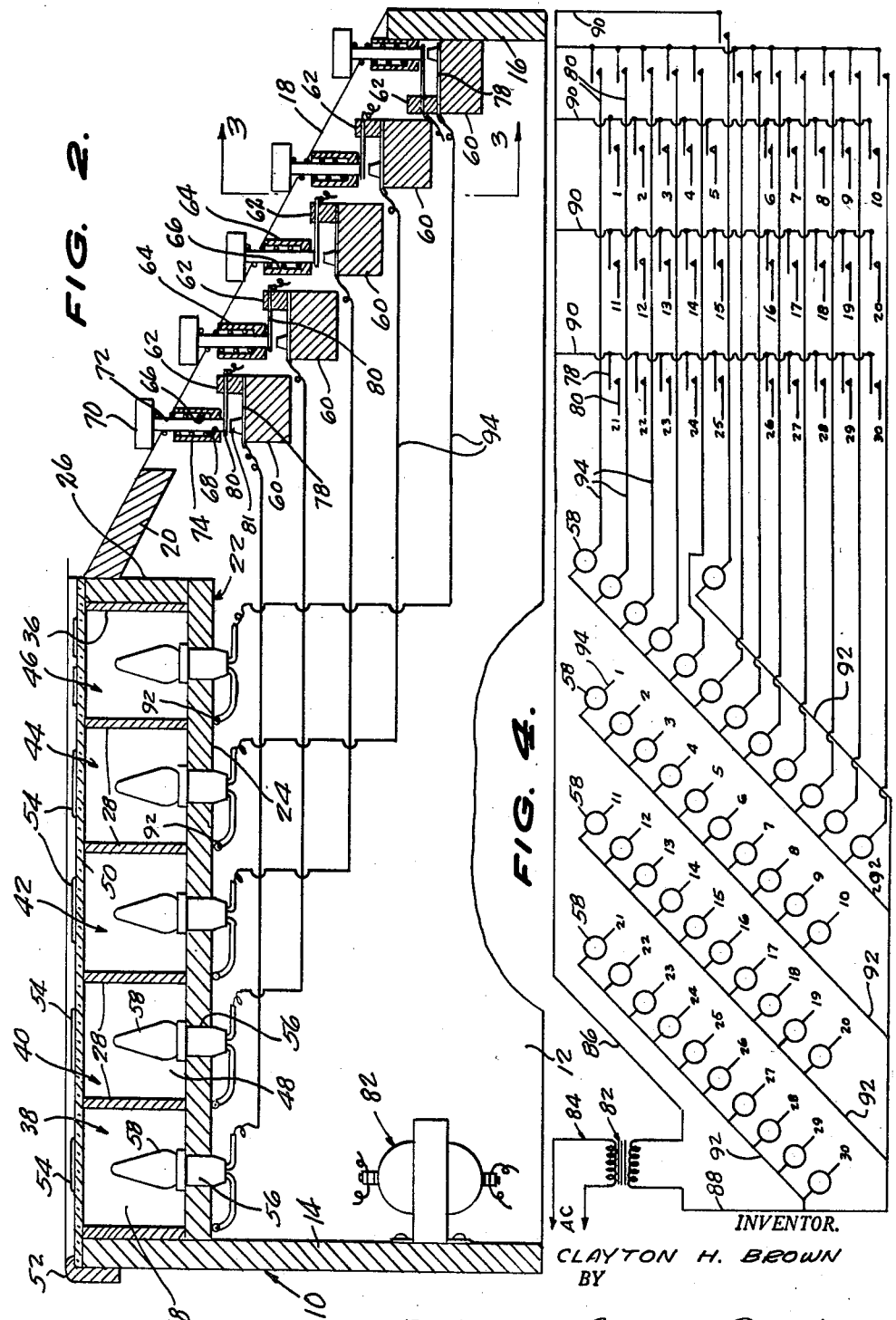
INVENTOR.
CLAYTON H. BROWN
BY
McMorrow, Berman & Davidson
ATTORNEYS.

United States Patent Office 2,931,108
Patented Apr. 5, 1960

2,931,108

EDUCATIONAL TYPEWRITER SIMULATING TOY

Clayton H. Brown, Richmond, Va.

Application September 12, 1958, Serial No. 760,734

3 Claims. (Cl. 35—5)

This invention relates generally to toys or to related articles, and more particularly has reference to a device of this nature so designed as to provide, with a high degree of amusement so far as the user is concerned, a simulation of the appearance, operating characteristics, and related features of a conventional typewriter.

It is believed to be a matter of general knowledge that young children are attracted to an apparatus which is adapted to be illuminated intermittently, particularly responsive to operation of the device by the child. Thus, any of various toys in which the child presses a button or operates an equivalent element, and by so doing causes an electric lamp bulb to be turned on or off, as the case may be, has been found to have a great attraction.

Obviously, it is desirable to associate, with toys or related amusement devices intended particularly for use by children, means that will, at the same time, educate the child, stimulate his reasoning ability, or improve his dexterity. If these desirable aims can be attained while, at the same time, affording the child maximum amusement by permitting the child to selectively illuminate any of various lamp bulbs, then it will be apparent that a highly worthwhile toy or equivalent device has been provided.

The main object of the present invention is to provide a toy which will meet the various tests outlined above. To this end, the toy comprising the present invention has the general characteristics of a conventional typewriter, in that it is provided with a plurality of rows of selectively depressible keys. The invention, summarized further, includes a plurality of compartments each of which is associated with an individual key. The compartments are covered with translucent material colored correspondingly to the key with which the compartment is associated, and on said material there is provided an indicium corresponding to that which would appear upon the appropriate key of a conventional typewriter.

The invention is so designed that on depression of a particular key, there will be illuminated a compartment corresponding to said key, thus illuminating the indicium appearing centrally in said compartment. In this regard, the keys depressible by the user are not provided with indicia, but rather, are merely colored correspondingly to the colors of the compartments, so that the child must rely upon his own memory, dexterity, and reasoning ability in selecting the proper key for depression. If the proper key is selected, the child is rewarded by illumination of the proper compartment. In this way, a high degree of amusement is afforded by the device, while at the same time the device has the many desirable educational qualities touched upon above.

Among important objects of the invention are the following:

First, to provide a device of the character stated which will afford maximum amusement, while yet having a decided educational value;

Second, to provide a device which, though intended primarily for use by children as an educational toy, is not necessarily limited to such use, and may, in fact, have advantageous use as an aid in the teaching of typewriting;

Third, to provide a device of the character stated which will be reliable in operation, and will be so designed as to require a minimum of maintenance and repair;

Fourth, to so form the device as to facilitate its manufacture at a comparatively low cost;

Fifth, to provide an electrical circuit, of the character stated, which particularly lends itself to the use of bus bars or other means designed to lower the cost of manufacture; and Sixth, to provide a keyboard assembly which is especially adapted to provide a low-cost means whereby each key is operable independently of all the others to momentarily close a circuit to a particular lamp bulb.

Other objects will appear from the following description, the claims appended thereto, and from the annexed drawings, in which like reference characters designate like parts throughout the several views, and wherein:

Figure 2 is an enlarged longitudinal sectional view therethrough taken substantially on line 2—2 of Figure 1;

Figure 4 is a diagram of the wiring employed in the device.

Figure 1:
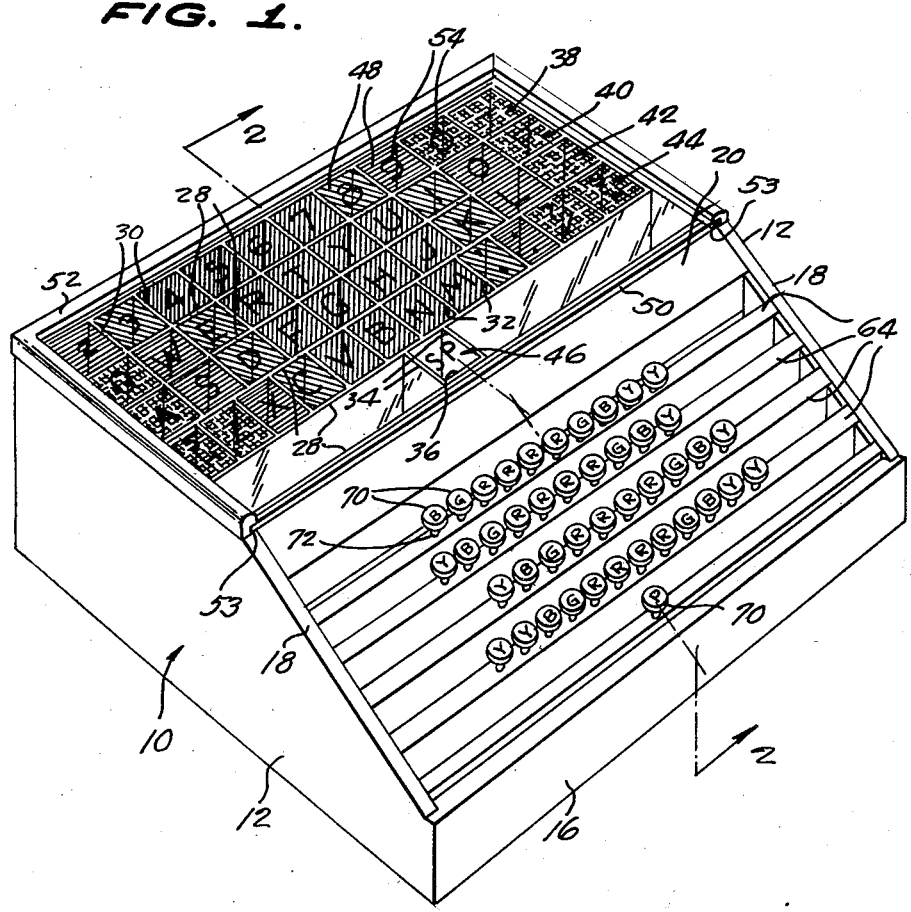
Figure 1 is a perspective view of an educational toy according to the present invention.
Figure 3:
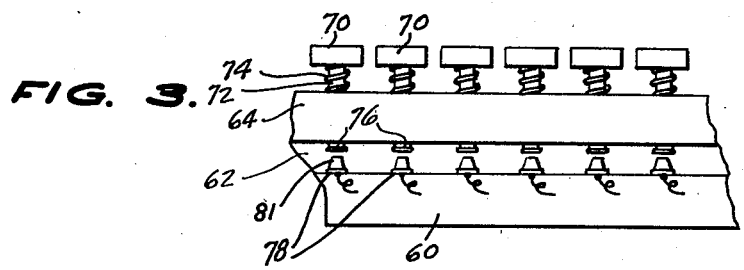
Figure 3 is a view, on the same scale as Figure 2, taken on line 3—3 of Figure 2.

Referring to the drawings in detail, the educational toy comprising the present invention includes a supporting frame generally designated 10. The frame is designed to simulate roughly the general appearance of the frame of a typewriter. To this end, the frame includes vertical side walls 12, fixedly secured at their rear edges to a transversely disposed, vertical, relatively high back wall 14. Side walls 12 at their forward edges are similarly secured to a relatively low front wall 16, with the side walls having forwardly declining top edges 18 sloping downwardly to the front wall. To reinforce the device there may be provided, intermediate the front and back walls, a crossbar 20 fixedly secured at its ends to and extending between the side walls 12, said crossbar being transversely tilted correspondingly to the slope of the edges 18. The crossbar could, of course, be used for marking thereon the particular name given to the device by the manufacturer.

Referring to Figure 2, there is provided a relatively shallow lamp bulb housing generally designated 22. This occupies the upper portion of the frame, over the full width of the frame, and over a distance extending from a location substantially midway between the front and back walls, fully to the back wall 14.

The housing 22 is relatively shallow, as shown in Figure 2, and includes a rectangular bottom plate 24, fixedly secured along its back and side edges to the back wall 14 and side walls 12 respectively. Housing 22 further includes a vertically disposed, transverse front wall 26, which extends in longitudinally contacting relation to the rear edge of the crossbar 20.

Housing 22 is provided with a plurality of relatively small, rectangular compartments arranged in rows extending transversely of the frame. To provide said compartments, there are parallel transverse partitions 28, which as shown in Figure 1 extend the full width of the housing. In the preferred, illustrated embodiment there are four transverse partitions 28.

In perpendicularly intersecting relation to the transverse partitions 28, there are longitudinal partitions 30. These are fixedly secured, in a typical embodiment, to the transverse partitions at the points of crossing of the several partitions 28, 30. Further, the partitions 28 would, of course, be secured at their ends to the respective side walls 12, with the partitions 30 being secured at their back edges to the back wall 14, and at their front edges to that partition 28 immediately in back of the forwardmost partition 28.

If desired, one might leave the partitions removable, so that in assembly of the device, a grid-like member could be preassembled, and then inserted bodily, though removably, in the bulb housing 22.

Extending between front wall 26 and the forwardmost partition 28 are short partitions 34, and extending between partitions 34 is a liner element 36.

The arrangement illustrated further includes partitions 32, which are offset in respect to, but are in parallel relation with, the partitions 30. Partitions 32 extend between the forwardmost partition 28 and the partition 28 immediately in back of said forwardmost partition.

By reason of the arrangement illustrated and described, there are defined transverse rows of compartments, said rows being generally designated 38, 40, 42, and 44. There is also provided a single compartment 46 in front of the row 44. The compartments of the several rows have been designated 48, and are relatively small, with all of said compartments being covered over by a translucent cover plate 50.

It will be noticed that the rows 38, 40, 42 are identical to one another in respect to the location and number of compartments. Each has ten compartments, and each compartment is aligned with corresponding compartments of the other rows. Row 44, however, has twelve compartments.

The cover plate 50 is held in place by a molding or retaining strip 52, that extends along the sides and back of the frame. Strip 52 has confronting guide grooves 53, slidably receiving the respective side edge portions of the cover plate 50. The cover plate can thus be readily removed, drawer-fashion, to permit access to the interior of any compartment.

The cover plate 50 is provided, on its top surface, with indicia 54, corresponding to the indicia found on the mainly used keys of a conventional typewriter keyboard. These indicia may be applied in any suitable manner, either as separate, raised letters or numerals, such as shown in Figure 2, or alternatively, by being painted upon the surface of the cover plate. In any event, the several indicia are associated with the several compartments of the various rows 38, 40, 42 and 44, and the arrangement of the several indicia is such as to correspond to the arrangement of characters upon the keys of a conventional typewriter keyboard. In this connection, it will be observed that certan of the indicia found on a conventional keyboard have been omitted, inasmuch as they are ordinarily used comparatively little.

The indicia of the top row of compartments 38, thus, comprise and are arranged similarly to the main indicia on the top row of a conventional typewriter keyboard; the indicia of row 40 bear a similar relationship to the next lower row of keys on a conventional keyboard; the indicia of row 42 correspond to the main indicia of the next lower row of keys on a conventional typewriter keyboard; and the indicia of row 44 correspond to those found on the lowermost row of keys of a typewriter keyboard. Compartment 46, bearing the indicium "SP" represents the spacer bar of a conventional typewriter. The compartments at the opposite ends of row 44 bear the indicium "SH," representing "shift."

Referring to Figure 2, centrally mounted in each compartment, in the bottom plate 24, is a conventional bulb socket 56, and engaged in each bulb socket is a lamp bulb 58.

In the illustrated example, the bulbs, and the walls of the compartments in which they are disposed, are identically colored. Plate 50, however, is of clear glass.

Different colors are used in the different compartments, in any of various selected arrangements which the manufacturer may prefer. Thus, in the illustrated example the compartments bearing the indicia "2" and "9" have their walls painted blue, and the bulb in each of these compartments would also so blue. Thus, when the bulb in each of these compartments is illuminated responsive to closing of a circuit therethrough, a blue light will be cast upwardly through the translucent cover plate 50, at the same time high-lighting the numeral indicium "2" or "9," as the case may be.

The color blue is used in various other compartments, as for example, those designated "W," "S," and "X." Other colors are used for other compartments, which may be selected at random. In all, in the illustrated example, the colors blue, green, red, and yellow would be used in the compartments representing the four rows of keys of a conventional typewriter keyboard.

Further, the colors would be mixed, more or less at random, so as to make it impossible for the ordinary user to learn to operate the machine by recollection of color patterns or by similar means that would defeat the purpose of the machine or toy.

The color of compartment 46, preferably is one which is not used in any of the rows 38, 42, or 44. In the illustrated example, pink would be used for the compartment 46, although this is, of course, not critical to successful operation of the device.

Further, colors can be associated with the various compartments in other ways. Rather than painting the walls of the compartments, one might merely use colored bulbs. Or, one may paint colored squares on the cover plate 50, permitting the use of clear bulbs, so long as the translucent characteristics of the cover plate are retained.

Referring now to Figure 2, fixedly connected between the forward portions of the side walls 12, in positions extending horizontally across the frame, are contact support bars 60. These are disposed at progressively lower levels, in a direction toward the front of the toy, that is, each bar 60 is slightly lower than the bar 60 immediately in back of the same.

Fixedly mounted upon the top surfaces of the bars 60 are relatively narrow, movable contact support strips 62. These strips are fixedly retained in place in any suitable manner, although if desired, they as well as any other component of the toy could be made removable for the purpose of facilitating assembly or repair.

In any event, it will be noted that the strips 62 on all but the lowermost bar 60 are disposed along the forward edges of the associated support bars. Strip 62 of the lowermost bar 60, however, is extended along the back edge of its associated bar, due to requirements imposed by the lack of space immediately in front of the lowermost bar 60.

Immediately above each bar 60, in spaced relation to its associated bar 60 and adjacent support strip 62, there is mounted a key support bar 64. Key support bar or strip 64 in each instance is fixedly connected between side walls 12, and at uniformly spaced intervals along the length of each bar 64, upwardly opening recesses 66 are formed therein. These are in communication with bores 68 opening through the bottoms of the respective bars or strips 64.

The toy includes a plurality of headed keys or buttons 70, each of which has a head fashioned somewhat similarly to the head of a conventional typewriter key. Depending from the head of each key is a stem or shank 72 of said key. Circumposed about the stem 72 of each key is a compression, coil spring 74, abutting at its opposite ends against the head of the key and the bottom surface of the associated recess 66.

To limit the upward movement of the keys 70 beyond their normal, raised positions shown in Figure 2, stems 72 at their lower ends have flanges or stop collars 76 that are engageable against the bottom surfaces of the several key-support strips 64.

Spaced uniformly along the length of each strip or bar 60, in positions extending transversely of said bar, are electrically conductive fixed contacts 78, each of which is disposed immediately below and is normally spaced from a movable spring contact 80, the free end of which underlies an associated key. As a result, on depression of a selected key, the contact 80 immediately below the same will be depressed against the inherent spring tension thereof into engagement with a terminal 81 provided upon the fixed contact 78 immediately below the depressed contact 80. The contacts thus close and will remain closed as long as the key is held in a depressed position.

The heads of the keys are not imprinted or otherwise marked with indicia, such as those found upon a conventional typewriter keyboard. Instead, the keys are merely colored correspondingly to particular compartments with which they are respectively associated. To indicate this, letters have been applied to the top surfaces of the keys in Figure 1, which letters are intended to indicate the colors of said keys. Thus, the blue keys are illustrated in Figure 1 as having the letter "B"; the green keys have the letter "G," etc. In a commercial embodiment, of course, these letters would not appear upon the surfaces of the keys. Rather, the keys would merely be colored to correspond with the colors of the compartments, and would be left completely blank.

Reference should now be had to Figure 4, showing the electrical circuit embodied in the invention. As will be noted from this figure of the drawings, the wiring of the device includes a transformer 82. In Figure 2, it is seen that such transformer can be conveniently mounted against the back wall 14, although, of course, this location of the transformer is not critical to successful operation of the invention.

Extending from opposite ends of one winding of the transformer 82 are leads extending to the opposite sides of a conventional 110-volt A.C. circuit, as shown at 84. This would be an ordinary house supply and the device would, of course, have a conventional convenience cord provided with an electric cap for connecting the device to said house supply of current.

From the opposite terminals of the other windings of the transformer extend leads 86, 88. Extending from the lead 86, at different locations along the length thereof, are branch leads 90. Branch leads 92 are similarly extended from the lead 88.

Each lead 92 extends along a row of lamp bulb sockets 56, and electrical connections are provided between one terminal of each socket 56 and the adjacent lead 92. Connected to the other terminals of the several sockets are leads 94, each of which extends to and is electrically connected to one of the movable contacts 80. Meanwhile, fixed contacts 78 are connected to leads 90. Each lead 90 extends along one of the bars or strips 60.

It will be understood that in the manufacture of the device, bus bars can be used wherever appropriate. For example, each lead 90 could comprise a bus bar, in the form of an electrically conductive strip secured to the associated support bar 60. In fact, each fixed contact 78 could be integrally connected to said electrically conductive strip or bus bar.

In order to simplify the showing of the wiring of the device, only the movable contacts 80 of the forwardmost row of keys are shown as connected directly to their associated lamp bulbs 58. The movable contacts of the other three rows have been designated, for convenience in facilitating an understanding of the arrangement, by numerals "1" through "30." Three of the rows of lamp bulbs 58 shown in Figure 4 have been illustrated with corresponding numerals "1" through "30." It will be understood that the movable contact adjacent the numeral "1" would be connected by a lead 94 to one terminal of the bulb 58 adjacent which there is also shown a numeral "1," etc. These particular numerals would not, of course, appear in the finished device and are inserted in the drawings merely to facilitate understanding of the wiring diagram.

It will be seen that associated with each key is a compartment of the same color as said key. It will further be seen that the compartment associated with each key bears an indicium 54 that corresponds, so far as its location on a conventional typewriter keyboard is concerned, with the location on the device at which the associated key is disposed. In other words, the key furthest to the left in the next to the highest row in Figure 1 would be colored yellow and would correspond to the location of the letter "Q" found on a conventional typewriter keyboard. The compartment associated with this particular key is the compartment furthest to the left in the row 40. This particular compartment has associated with it the letter "Q," and furthermore, this compartment is yellow in color. Depression of the key furthest to the left in the second row of keys will, of course, cause illumination of the compartment over which is displayed the letter "Q." If, then, the child has intended to "type," so to speak, the letter "Q," the child will find that he or she has correctly chosen a key, if on depression of the selected key the compartment furthest to the left in the row 40 is illuminated.

It is thus apparent that there is a highly amusing characteristic to the invention, calculated to retain the child's interest to the maximum extent. As different keys are depressed, corresponding different compartments are illuminated. The fact that these compartments are of different colors further heightens the amusement gained through use of the device.

Still further, there is an educational value in the toy. The child learns to recognize colors, and this is one educational value found in the device. Secondly, the child learns to use a typewriter keyboard, and in addition, learns to recognize numbers and letters.

Apart from this, dexterity is promoted, that is, by practice, the child learns to strike squarely and accurately any key which he selects. Speed can be built up, also, by repeated use of the device.

Apart from the above, the invention has the desirable characteristics in that the child is given the added enjoyment of operating a device which simulates with a high degree of faithfulness a conventional typewriter.

In addition, the device, though having the several desirable characteristics mentioned above, is still designed for manufacture at a comparatively low cost, by reason of the relatively simplified arrangement of keys, compartments, wiring, etc.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. An educational toy of the typewriter type, comprising a supporting frame; means mounted in said frame defining a plurality of upwardly opening compartments, said compartments being arranged in rows corresponding to the rows of a conventional typewriter keyboard, said compartments being arranged in groups, each row including compartments of a plurality of groups, the compartments of each group having in common a color not found in any other group; a translucent cover plate overlying each compartment; electrical lamp bulbs mounted one in each compartment, so as to cast light beams of the color of said compartment through the cover plate; a plurality of depressible keys supported in the frame in rows corresponding generally to the rows of a conventional typewriter keyboard, and further corresponding in number and location to the several first-named rows, each key being of a color corresponding to the color of an associated compartment; a set of normally open contacts mounted adjacent each key in position to be closed responsive to depression of the associated key; and means connecting each bulb in circuit with a single set of contacts and with a source of electrical power, for energizing said bulbs selectively, responsive to depression of corresponding, selected keys.

2. An educational toy of the typewriter type, comprising a supporting frame; means mounted in said frame defining a plurality of upwardly opening compartments, said compartments being arranged in rows corresponding to the rows of a conventional typewriter keyboard, said compartments being arranged in groups, each row including compartments of a plurality of groups, the compartments of each group having in common a color not found in any other group; a translucent cover plate overlying each compartment; electrical lamp bulbs mounted one in each compartment, so as to cast light beams of the color of said compartment through the cover plate; a plurality of depressible keys supported in the frame in rows corresponding generally to the rows of a conventional typewriter keyboard, and further corresponding in number and location to the several first-named rows, each key being of a color corresponding to the color of an associated compartment; a set of normally open contacts mounted adjacent each key in position to be closed responsive to depression of the associated key; and means connecting each bulb in circuit with a single set of contacts and with a source of electrical power, for energizing said bulbs selectively, responsive to depression of corresponding, selected keys, said cover plate including an indicium centered above each compartment representing an indicium found upon a key of a conventional typewriter keyboard, the indicia of the several compartments being arranged similarly to the indicia of said keyboard, said keys being unmarked save for the coloring thereof correspondingly to their associated compartments.

3. An educational toy of the typewriter type, comprising a supporting frame; means mounted on said frame defining a plurality of colored compartments arrayed in rows corresponding to the rows of a conventional typewriter keyboard, the compartments being arranged in groups with the compartments of each group having in common a color not found in any other group; electrical lamp bulbs mounted one in each compartment, so as to illuminate the same when energized; a plurality of depressible keys supported in the frame in rows corresponding generally to the rows of a conventional typewriter keyboard, and further corresponding in number and location to the several first-named rows, each key being of a color corresponding to the color of an associated compartment; a set of normally open contacts mounted adjacent each key in position to be closed responsive to depression of the associated key; and means connecting each bulb in circuit with a single set of contacts and with a source of electrical power, for energizing said bulbs selectively, responsive to depression of corresponding, selected keys.

References Cited in the file of this patent

UNITED STATES PATENTS

| | | |
|---|---|---|
| 2,500,507 | Avery et al. | Mar. 14, 1950 |
| 2,613,453 | Gecsei | Oct. 14, 1952 |

FOREIGN PATENTS

| | | |
|---|---|---|
| 989,016 | France | May 16, 1951 |
| 365,928 | Great Britain | Jan. 28, 1932 |